US008976932B2

(12) United States Patent
Ishida

(10) Patent No.: US 8,976,932 B2
(45) Date of Patent: Mar. 10, 2015

(54) X-RAY GENERATING DEVICE

(75) Inventor: Toshiyuki Ishida, Toyohashi (JP)

(73) Assignee: BSR Co., Ltd., Nagoya-shi, Aichi (JP)

( * ) Notice: Subject to any disclaimer, the term of this patent is extended or adjusted under 35 U.S.C. 154(b) by 319 days.

(21) Appl. No.: 13/808,971

(22) PCT Filed: Jul. 7, 2011

(86) PCT No.: PCT/JP2011/065625
§ 371 (c)(1),
(2), (4) Date: Jan. 8, 2013

(87) PCT Pub. No.: WO2012/005338
PCT Pub. Date: Jan. 12, 2012

(65) Prior Publication Data
US 2013/0129054 A1 May 23, 2013

(30) Foreign Application Priority Data
Jul. 9, 2010 (JP) ................................ 2010-156296
Aug. 10, 2010 (JP) ................................ 2010-179643
Aug. 10, 2010 (JP) ................................ 2010-179649

(51) Int. Cl.
*G21K 5/00* (2006.01)
*G01N 23/223* (2006.01)
*G01N 21/33* (2006.01)
(Continued)

(52) U.S. Cl.
CPC ............... *H01J 35/065* (2013.01); *H01J 35/32* (2013.01)
USPC ...... 378/119; 378/121; 250/423 F; 250/493.1

(58) Field of Classification Search
CPC .................... G01N 2223/204; G01N 23/2251; G01N 23/2252; H01J 37/28
USPC ...................... 250/493.1, 423 F; 378/119, 121
See application file for complete search history.

(56) References Cited

U.S. PATENT DOCUMENTS

2004/0200977 A1* 10/2004 Rieger et al. .................. 250/398
2008/0042057 A1* 2/2008 Sanada et al. ................. 250/305
2014/0077078 A1* 3/2014 Hatakeyama et al. ......... 250/310

FOREIGN PATENT DOCUMENTS

JP 2000-208294 A 7/2000
JP 3090910 7/2000

(Continued)

OTHER PUBLICATIONS

English translation of International Search Report for PCT/JP2011/065625.

(Continued)

*Primary Examiner* — Nikita Wells
(74) *Attorney, Agent, or Firm* — Quarles & Brady LLP; Gavin J. Milczarek-Desai

(57) ABSTRACT

In an X-ray generator using an ultraviolet laser, the generation of the X-ray is stabilized. In an X-ray generation method for irradiating an ultraviolet laser beam emitted from an ultraviolet laser beam generator on an ultraviolet laser beam receiving surface of an electron beam emitting device, irradiating an electron beam emitted from an electron beam emitting surface of the electron beam emitting device distinguished from the ultraviolet laser beam receiving surface on a metal piece and generating an X-ray from the metal piece, denaturalization of substance of the ultraviolet laser beam receiving surface is prevented by controlling the ultraviolet laser beam.

14 Claims, 14 Drawing Sheets

(51) Int. Cl.
*H01J 35/06* (2006.01)
*H01J 35/32* (2006.01)

(56) References Cited

FOREIGN PATENT DOCUMENTS

| | | | |
|---|---|---|---|
| JP | 2005-174556 | | 6/2005 |
| WO | 2008/123301 | A1 | 10/2008 |

OTHER PUBLICATIONS

Kisa et al, "Electron Emission from a Lithium Niobate Crystal Excited by Ultra-Violet Laser," p. 668 of Extended Abstracts; The Japan Society of Applied Physics No. 2 dated Sep. 8, 2009.

Kisa et al, Electron Emission from LiNbO3 Crystal Excited by Nd:YAG Laser, p. 126 of Extended Abstracts; The Japan Society of Applied Physics and the related Societies dated Mar. 3, 2010.

Hiro et al. (Kyoto Univ.), "Develop of X-Ray Generator by Pyroelectric Crystal and Laser Light," 44th X-Ray Analysis Symposium, Oct. 18, 2008, P21.

Ida et al., "Portable X-Ray Fluorescence Spectrometer with a Pyroelectric X-Ray Generator," X-Ray Spectrometry 2005:34:225-229, published online Jan. 31, 2005 in Wiley InterScience (www.interscience.wiley.com). DOI: 10.1002/xrs.800.

Kisa et al, "Electron Emission from LiNbO3 Crystal Excited by Nd:YAG Laser," J.Vac.Sci.Technol.B 28(2), Mar./Apr. 2010.

English translation of International Preliminary Report on Patentability for PCT/JP2011/065625.

* cited by examiner

CASE (1) SUS PLATE IS CONNECTED THROUGH CURRENT INTRODUCTION TERMINAL DIRECTLY TO GROUND.

CASE (2) SUS PLATE IS CONNECTED TO VACUUM CHAMBER and CONNECTED THROUGH VACUUM CHAMBER INDIRECTLY TO GROUND.

CASE (3) SUS PLATE IS NOT CONNECTED TO GROUND BUT INSULATED FROM GROUND.

CASE(1)

CASE(2)

CASE(3)

X-RAY GENERATING DEVICE

TECHNICAL FIELD

The present invention relates to an electron beam emitting device.

BACKGROUND

In technological development, an X-ray generator has been downsized to improve transportability, reduce occupied space and consumed energy and realize the minimum exposure to an X-ray.

In general, an X-ray generator has the structure for emitting an electron beam from an electron source, accelerating the electron by high electric field generated by a high potential source, irradiating the electron accelerated with high energy on a metal piece and emitting an X-ray from the metal piece.

For example, in an X-ray generator disclosed in the non-patent document 1, a downsized X-ray tube provided with a field emission type carbon nanotube cathode as an electron source, a high potential generator for applying the X-ray tube with high voltage ultra short pulses and a high frequency coaxial cable are used.

In addition, an X-ray generator for heating a pyroelectric member by a Peltier device, irradiating an electron emitted from the pyroelectric member on a copper piece and emitting an X-ray from the copper piece is proposed as referred to the non-patent document 1.

The technology related to the present invention is also referred to the non-patent documents 2-4.

RELATED PATENT DOCUMENT

Patent Document

Patent document 1: JP-B-3090910

Non-Patent Document

Non-patent document 1: Published online 31 Jan. 2005 in Wiley InterScience. DOI: 10.1002/xrs.800

Non-patent document 2: Develop of X-ray generator by pyroelectric crystal and laser light, 44th X-ray analysis synoisium, Oct. 18, 2008, P21

Non-patent document 3: Electron emission from LiNbO3 crystal excited by Nd:YAG laser, Extended abstracts of the $57^{th}$ meeting 2010, The Japan Society of Applied Physics and the Related Societies.

Non-patent document 4: Electron emission from LiNbO3 crystal excited by ultraviolet laser, J.Vac.Sci.Technolo.B28 (2),March/April 2010

SUMMARY OF THE INVENTION

Problems to be solved by the Invention

All the X-ray generators described above realize the downsizing. However, Inventors of the present invention suggest the following problems through their investigation.

A small X-ray generator is used for a cancer treatment. In the cancer treatment, the small X-ray generator is inserted into a human body to irradiate an X-ray directly on a cancer cell. If the small X-ray generator provided with a field emission type carbon nanotube cathode is used from such a view point, it becomes necessary to apply high voltage to the cathode. Even if an insulated coaxial cable is used, the small X-ray generator makes the people concerned reluctant to the treatment.

Further, in the X-ray generator using a pyroelectric member, the pyroelectric member is provided on a Peltier device to emit an electron from the pyroelectric member heated by the Peltier device. So, in the X-ray generator provided using the pyroelectric member, it is not necessary to apply high voltage to the Peltier device. However, while the pyroelectric member is cooled, electrons are continuously emitted from the pyroelectric member still at high temperature. So, it is difficult to control on and off of the X-ray generation. It takes time to completely shut off the electron emission from the pyroelectric member by cooling the whole of the pyroelectric member.

In each of the methods disclosed in the non-patent documents 3 and 4, it is difficult to emit an X-ray with an intensity strong enough for the cancer treatment.

Inventors of the present invention propose a new X-ray generator for emitting an X-ray from an pyroelectric member by irradiating an ultraviolet laser beam on the pyroelectric member in a prior patent application PCT/JP2010/002489.

The Inventors have studied the X-ray generator to stabilize the generation of the X-ray.

Means for Solving the Problem

The one of the objects of the present invention is to stabilize the generation of an X-ray in an X-ray generator which utilizes an ultraviolet laser beam.

The inventors turned their attention on the fact that the ultraviolet laser beam receiving surface of the pyroelectric member changed in color when the ultraviolet laser beam was irradiated on the pyroelectric member. As a reason for the change in color, the denaturalization or the desorption of the substance of the pyroelectric member itself, or the denaturalization or the absorption of the gas particles around the pyroelectric member is considered. In any case, in the ultraviolet laser beam receiving surface of the pyroelectric member, the substance which is denaturalized by absorbing the energy of the ultraviolet laser beam is easily ionized to make the potential unstable on the ultraviolet laser beam receiving surface. As a result, it is considered that the potential becomes unstable on the surface opposite to the ultraviolet laser beam receiving surface, namely the electron beam emitting surface of the pyroelectric member.

Accordingly, the Inventors stabilize the potential on the ultraviolet laser beam receiving surface (the first surface) by preventing the ultraviolet laser beam receiving surface from being denaturalized, so that the electron beam is stably emitted. As a result, it was observed that the stable X-ray with a strong intensity is generated.

Namely, the first aspect of the present invention is defined in the following.

An X-ray generator comprising:

an ultraviolet laser beam generator;

an electron beam emitting device having an ultraviolet laser beam receiving surface for receiving an ultraviolet laser beam generated by the ultraviolet laser generator and an electron beam emitting surface distinguished from the ultraviolet laser beam receiving surface for emitting an electron beam;

a metal piece for receiving the electron beam emitted from the electron beam emitting surface to emit an X-ray; and denaturalization prevention means for preventing a substance forming the ultraviolet laser beam receiving surface from being denaturalized by the ultraviolet laser beam.

According to the X-ray generator as defined in the first aspect of the present invention, for example, even if the ultraviolet laser beam is irradiated on the electron beam emitting device like the pyroelectric member, the substance on the ultraviolet laser beam receiving surface is not changed. The electron beam emitting device is also referred to the device hereinafter. Since the substance is not ionized, the potential on the ultraviolet laser beam surface is stabilized in the device. Here, the potential is not necessarily zero. Accordingly, the electron beam is emitted stably from the electron beam emitting surface. Such the electron beam is irradiated on the metal piece to emit the X-ray from the metal piece.

The second aspect of the present invention is defined in the following.

Namely, in the X-ray generator defined in the first aspect of the present invention, the denaturalization prevention means includes a controller for controlling the ultraviolet laser beam generator to make an intensity of an unitary pulse constituting the ultraviolet laser beam less than 1000 μJ or equal to 1000 μJ and a width of the unitary pulse less than 100 ns or equal to 100 ns.

According to the study of the Inventors, the comparatively low intensity of the unitary pulse of the ultraviolet laser beam prevents the substance on the ultraviolet laser beam receiving surface of the device from being denaturalized or ionized. On the other hand, the width of the unitary pulse of the ultraviolet laser beam less than 100 ns or equal to 100 ns makes the total energy amount of the ultraviolet laser beam per time large enough by simultaneously keeping the intensity of the unitary pulse low.

In other words, the intensity of the unitary pulse is determined not to denaturalize the substance possibly existing on the ultraviolet laser beam receiving surface, namely the substance constituting the device and the gaseous substance surrounding the receiving surface. The total energy amount of the ultraviolet laser beam per time is determined to emit the electron beam from the electron beam emitting surface of the device.

The intensity of the unitary pulse of the ultraviolet laser beam and the total applied energy of the ultraviolet laser beam per time can be determined correspondingly to the material constituting the device and the atmosphere surrounding the device. For example, it is preferred that the intensity of the unitary pulse constituting the ultraviolet laser beam is less than 1000 μJ or equal to 1000 μJ and the width of the unitary pulse is less than 100 ns or equal to 100 ns. The respective minimum values are restricted by the wavelength, the frequency and the total energy per time.

In the device of the present invention, $LiNbO_3$ single crystal, $LiTaO_3$ single crystal or the like may be used as the pyroelectric member. Further, ferroelectric substance including PLZT (Lead-lanthanum zirconate-titanate) or the like may be used as the pyroelectric member. According to the Inventor's study, even if the controlled ultraviolet laser beam is irradiated on the device, the temperature of the device does not change practically in principle. Incidentally, the temperature of the device sometimes rose by the shift of the irradiated position or the like to reduce the emission amount of the X-ray.

In the case described above, the emission amount of the X-ray recovered when the irradiation of the ultraviolet laser beam was shut off or the irradiation energy per time was reduced (1) and/or when the device was cooled. Incidentally, for cooling the device (2), the method for disposing the electron beam emitting device in contact with or near to low temperature substance including a peltier device or the like, or circulating coolant around the electron beam emitting device may be adopted.

It is preferred that a thermometer for measuring the temperature of the device is provided to control the temperature of the device.

Further, in the Inventor's study, it is found that the atmosphere surrounding the ultraviolet laser beam receiving surface is not particularly restricted in the device by controlling the ultraviolet laser beam. Namely, the ultraviolet laser beam receiving surface may be exposed to air. Even in the case described hereinbefore, it is necessary to dispose the electron beam emitting surface and the metal piece faced with the electron beam emitting surface of the device within vacuum.

In case that substance denaturalized remarkably on the ultraviolet laser beam receiving surface is applied to the device, it is preferred that the ultraviolet laser beam receiving surface is hermetically covered with a protection film which is stable and transparent to the ultraviolet laser beam. It is important to form the protection film of material which absorbs the ultraviolet laser beam of the applied wave length as less as possible, which prevents the temperature rise of the device caused by the absorption of the ultraviolet laser beam. For example, when an ultraviolet ray of wavelength 266 nm which is a quadruple wave of YAG laser is applied, it is preferred to use inorganic material including composite quartz glass, magnesium fluoride or the like which transmits the ultraviolet ray more than 90%. When such the protection film which absorbs the ultraviolet ray although minutely is used, it is preferred to provide the cooling system. It is preferred that the protection film is conductive or dielectrically polarized as a dielectric although an insulator. In addition, if the thickness of the protection film is less than the nanometer order, it becomes necessary to contact the conductive material even minutely. In this case, it is preferred to avoid the arrangement for contacting the conductive material itself with another conductor. Although the necessity for avoiding such the arrangement depends on the resistivity of the conductor, it is most preferable to avoid such the arrangement. Namely, it is necessary to form the condition electrically insulated from the ground. In other words, for compensating the charge necessary for the spontaneous polarization from outside, it is necessary to promote the rapid movement of the charge easily. In addition, the sudden temperature rise caused through the conductor of the earth line by the external disturbance is also prevented.

As an ultraviolet laser beam generator, a YAG laser generator may be used, for example. The ultraviolet laser beam generated from the ultraviolet laser beam generator is introduced to the one edge of an optical fiber which is faced with the ultraviolet laser beam receiving surface of the device at the other edge of the optical fiber. A laser diode or a light emitting diode constituted by III group nitride family chemical compound semiconductor may be used. An exicimer laser is preferably used for outputting high power.

It is preferred to apply an ultraviolet laser beam with wavelength less than or equal to 300 nm. Most of the ultra-violet ray with such short wavelength is absorbed on the uppermost surface of the pyroelectric substance to attain the high energy conversion efficiency. The wavelength of the ultraviolet laser beam is determined to have larger energy than the band gap energy of the applied electron beam emitting device. For preventing the denaturalization of the substance caused by the energy concentration, it is preferred that the ultraviolet laser beam is irradiated with uniform intensity on all over the ultraviolet laser beam receiving surface of the electron beam emitting device.

It is preferred that the ultraviolet laser beam is irradiated on the opposite surface to the surface faced with the metal piece in the electron beam emitting device.

So, the metal piece, the electron beam emitting device and the ultraviolet laser beam generator are arranged on a line. As a result, the whole apparatus can be assembled easily.

When a stick like pyroelectric substance is used as the electron beam emitting device, the one edge of the stick like pyroelectric substance is faced with the metal piece and the other edge is irradiated by the ultraviolet laser beam.

In the electron beam emitting device, a protrusion may be formed on the electron beam emitting surface faced with the metal piece by a fine fabrication process to promote the emission of the electron.

For the metal piece, a thin plate formed of copper or copper alloy may be used. As a matter of course, if the X-ray is emitted in accordance with the irradiation of the electron, metal except copper, namely, aluminum or aluminum alloy may be used, for example.

A member for supporting the electron beam emitting device may be selected arbitrarily in condition for making no effect on the emission of the electron. For example, the side face of the electron beam emitting device except the ultraviolet laser beam receiving surface and the electron beam emitting surface may be supported by an insulator. In addition, the ultraviolet laser beam receiving surface may be fixed to a conductive supporting member by a cantilever. In this case, it is preferred to make the conductive supporting member electrically floating, namely not connected to the ground. By adopting the constitution described above, the configuration of the apparatus can be simplified in correspondence to the requirements for downsizing and saving weight.

EMBODIMENTS

Embodiments of the present invention are described in the following.

Figure 1:
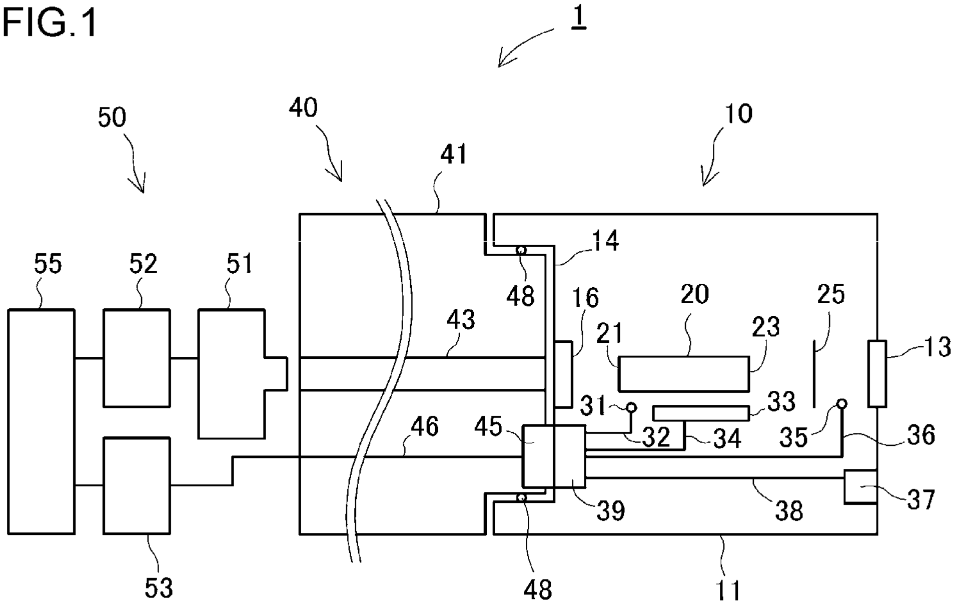
FIG. 1 is a block diagram showing the structure of an X-ray generator of an embodiment.

FIG. 1 is a schematic diagram showing the structure of an X-ray generator 1 of an embodiment. The X-ray generator 1 is suitably configured to be inserted to the digestive organ or the like of a human body.

The X-ray generator 1 has a head unit 10, a fiber unit 40 and a control unit 50.

The head unit 10 is provided with a cylindrical chassis 11 which has a concave configuration 14. At the central position of the forefront surface of the chassis 11, an X-ray transmission window 13 formed of beryllium is provided. At the central position of the bottom surface of the concave configuration 14, an ultraviolet ray transmission window 16 formed of quartz glass is provided to transmit an ultraviolet laser beam. Inside of the chassis 11, a vacuum condition is held approximately between $10^{-3}$ and $10^{-4}$ Torr.

Inside of the chassis 11, a pyroelectric member 20 and a copper piece 25 are provided. The pyroelectric member 20 is formed cylindrically of $LiNbO_3$ single crystal and used for the electron beam emitting device. The ultraviolet ray transmission window 16, the pyroelectric member 20, the copper piece 25 and the X-ray transmission window 13 are disposed on the same axis.

In FIG. 1, a thermocouple thermometer 31, a Peltier device 33, an X-ray detector 35 and an optical device 37 are connected through respective lines 32, 34, 36 and 38 to the connector 39. Each line includes a power source line and a signal line as the need arises. The optical device 37 is provided with a light source and a camera to protrude from the chassis 11. An LED light source may be used for the light source and a CCD may be used for the camera. When the head unit 10 is inserted into the digestive organ of a human body, the appearance around the inserted area can be observed visually by the optical device 37.

The connector 39 is disposed in the concave configuration 14 of the chassis 11 so that the connector 39 is connected with the connector 45 of the fiber unit 40.

The fiber unit 40 has a structure that an optical fiber 43 and a line 46 are inserted to a fiber main body 41 which is generally used for a fiber unit of a gastric endoscope or the like. For the optical fiber 43, an optical fiber used for ultraviolet rays may be applied. For example, for the core unit of the optical fiber 43, quartz glass may be used. The line 46 includes a power source line and a signal line.

The forefront of the fiber unit 40 is inserted to the concave configuration 14 of the head unit 10 to seal both the forefront and the concave configuration 14 by a gasket 48.

The control unit 50 has an ultraviolet laser beam generator 51, a driver 52 for the ultraviolet laser beam generator 51, and a controller 53 for controlling electric devices 31, 33, 35, 37 and 39 within the head unit 10. The numeral 55 indicates another controller for controlling the driver 52 and the controller 53.

The light emitting unit of the ultraviolet laser beam generator 51 is faced with the optical fiber 43 which is provided on the base end section of the fiber unit 40. On such the optical fiber 43, the ultraviolet laser beam is irradiated.

For the ultraviolet laser beam generator 51, a YAG pulse laser oscillator may be used. The output power of the YAG pulse laser oscillator is restricted by the driver 52. The wavelength of the ultraviolet laser beam is not particularly restricted if the electron beam emitting device 20 can be activated to work, namely to emit an electron beam from the device 20. Even so, it is preferred that the wavelength of the ultraviolet laser beam is shorter than the transmission wavelength of the electron beam emitting device 20.

The temperature of the electron beam emitting device 20 is sometimes increased by the irradiation of the ultraviolet laser beam. So, in this example, the Peltier device 33 is provided near the electron beam emitting device 20 to cool the electron beam emitting device 20 by the cooled Peltier device 33. For increasing the cooling efficiency, the Peltier device 33 may contact the electron beam emitting device 20 with insulating material.

When the temperature of the electron beam emitting device 20 rises above the predetermined temperature, the controller 53 may apply current to the Peltier device 33 according to the predetermined program, for cooling the electron beam emitting device 20 through the cooled Peltier device 33. When the electron beam emitting device 20 is cooled below the predetermined temperature, the controller 53 suspends the current to the Peltier device 33.

If a heat-exchanger is provided inside of the chassis 11 for applying coolant, the control for cooling the electron beam emitting device works out by circulating the coolant through the fiber unit 40 similarly to the control described above.

An X-ray detector is provided between the copper piece 25 and the ultraviolet ray window 13. The output power of the X-ray detector 35 is monitored by the controller 53. If the amount of X-ray radiation exceeds the predicted threshold value, the controller 53 transmits a signal to the controller 55 so that the controller 55 can transmits a control signal to the driver 52. Then, the driver 52 moves the shutter of the ultraviolet laser beam generator 51 to suspend the emission of the ultraviolet laser beam or decrease the output power of the ultraviolet laser beam.

The status that the amount of X-ray radiation exceeds the predicted threshold value also includes the status that the radiation of the X-ray is observed even if small when the X-ray should not be radiated, in addition to the status itself that the amount of X-ray radiation exceeds the predicted threshold value.

Figure 2:
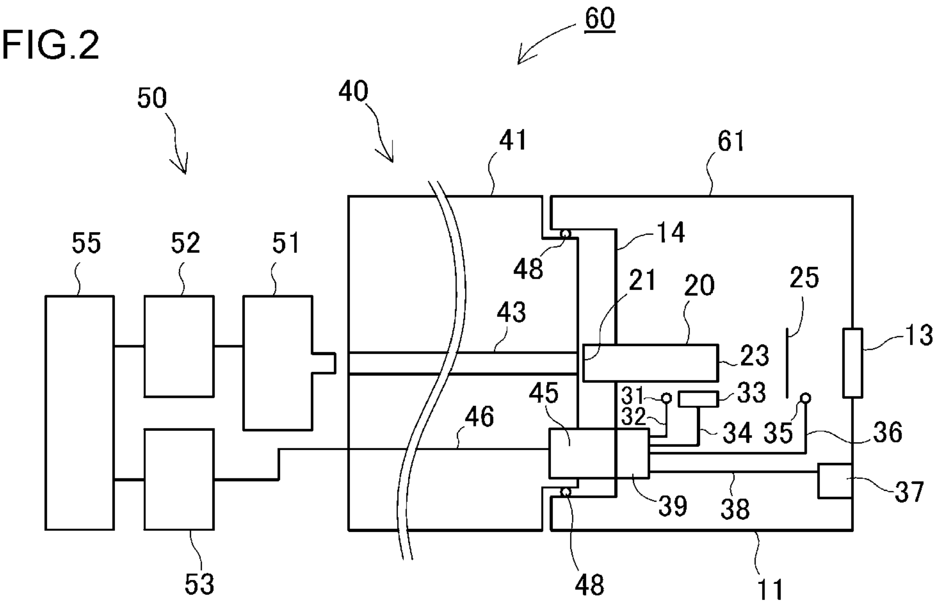
FIG. 2 is a block diagram showing the structure of an X-ray generator of another embodiment.

FIG. 2 shows an X-ray generator of another embodiment. The same element as that of FIG. 1 is referred to the same numeral as that of FIG. 1 and the explanation thereof is eliminated.

As shown in the embodiment of FIG. 2, in the head unit 61, the ultraviolet laser beam receiving surface 21 of the electron beam emitting device 20 protrudes outwardly from the chassis 11. Even if the ultraviolet laser beam receiving surface 21 of the electron beam emitting device 20 is exposed to the atmosphere as described above, the generation of an X-ray can be detected similarly to that of the embodiment of FIG. 1.

Since the ultraviolet laser beam receiving surface 21 protrudes outwardly from the chassis 11 in the embodiment described above, the receiving surface 21 can be cleaned up easily when used repeatedly to extend the lifetime of the head 61.

In each embodiment described above, the configuration for irradiating the controlled ultraviolet laser beam on the pyroelectric member 20 to emit the electron beam from the pyroelectric member 20 constitutes a new electron beam emitting device.

Inventors are now study a principle for emitting the electron beam from the pyroelectric member by irradiating the controlled ultraviolet laser beam on the pyroelectric member. Inventors found at least a fact that the ultraviolet laser beam receiving surface does not change in color at all by controlling the irradiation of the ultraviolet laser beam. Namely, the material of the ultraviolet laser beam receiving surface is not denaturalized at all, or the quantity of the denaturalized material is very small even if the ultraviolet laser beam receiving surface is denaturalized. So, the potential of the ultraviolet laser beam receiving surface becomes stable to stabilize the potential of the electron beam emitting surface. The stable X-ray is emitted from the copper piece which has received the stable electron beam.

For preventing the material of the ultraviolet beam receiving surface from being denaturalized, it may be taken into consideration to cover the ultraviolet laser beam receiving surface with a protection film. The protection film is stable and transparent to the ultraviolet laser beam. In addition, the protection film is airtight and adhered to the ultraviolet laser beam receiving surface to prevent easily denaturalized material from being put between the protection film and the receiving surface.

Such the protection film is formed of inorganic material including magnesium fluoride or the like. In addition, it is preferred in the pyroelectric member that the wall around and near the receiving surface is also covered with the protection film.

The controlled ultraviolet laser beam is irradiated on the electron beam emitting device 20. When the electron beam is emitted stably from the electron beam emitting device, a high potential arises on the electron beam emitting surface of the electron beam emitting device. In other words, the electron beam emitting device is not only an electron gun but also a high potential generating device. The high potential arising in the electron beam emitting device can be converted into other kinds of thermal energy, light energy or the like or signal.

Figure 3:
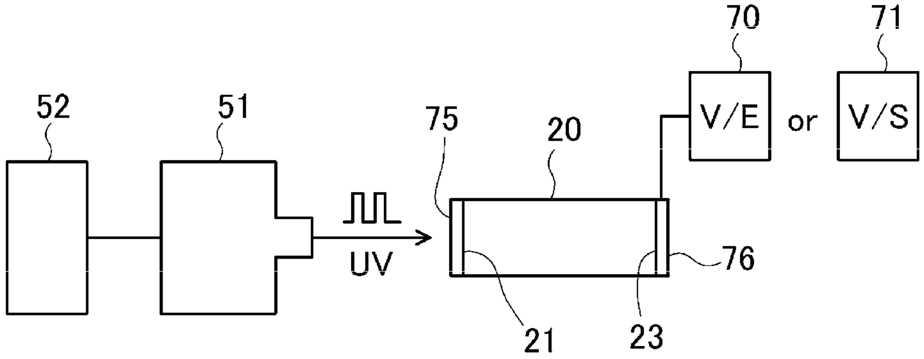
FIG. 3 is a block diagram showing an energy conversion system of an embodiment.

FIG. 3 shows the constitution of a system therefore.

In FIG. 3, the same element as that of FIG. 1 is referred to the same numeral as that of FIG. 1 and the explanation thereof is eliminated. In FIG. 3, the numeral 70 indicates a converter for converting voltage to another kind of energy, and the numeral 71 indicates another converter for converting voltage to signal. These converters 70 and 71 are coupled to the electron beam emitting surface 23 of the electron beam emitting device 20. It is preferred that the electron beam emitting surface 23 is covered with a conductive film 76.

On the other hand, it is preferred in the electron beam emitting device that the ultraviolet laser beam receiving surface 21 is covered with a protection film 75 for preventing the ultraviolet laser beam receiving surface 21 from being denaturalized.

EXAMPLES

Next, one example of the present invention is described in the following.

Figure 4:
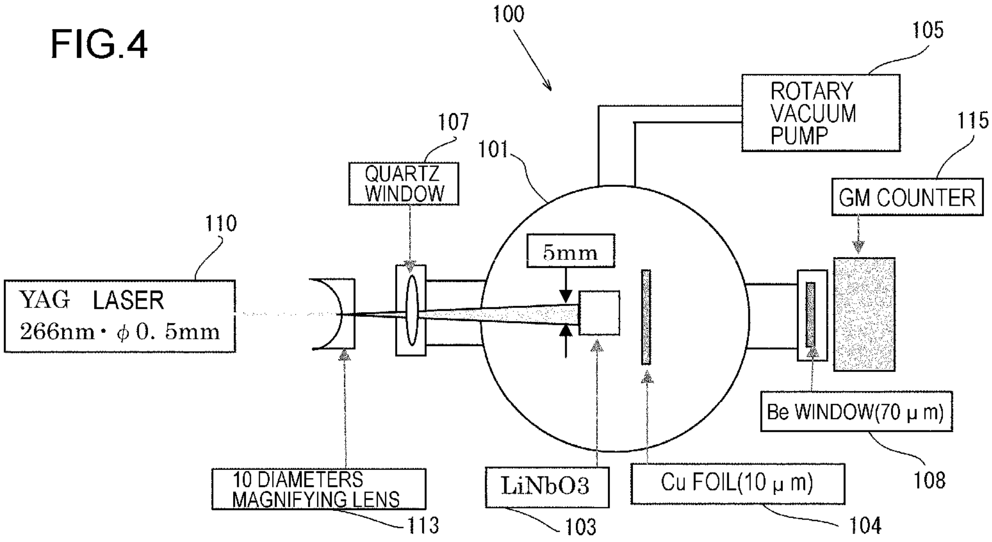
FIG. 4 is a schematic diagram for showing the constitution of an X-ray generator of an example.

FIG. 4 is a schematic diagram for showing the constitution of an X-ray generator 100 of the example.

Namely, inside of a chamber 101 of the X-ray generator 100, pyroelectric member 103 formed of $LiNbO_3$ as the electron beam emitting device and copper foil 104 are provided. The pressure of the chamber 101 is reduced to $5\times10^{-4}$ Torr by a rotary vacuum pump 105. The chamber 101 is provided with a quartz window 107 for guiding the ultraviolet laser beam and a beryllium window 108 for emitting the X-ray.

A YAG laser generator 110 is used for the ultraviolet laser beam generator. The laser beam emitted from the YAG laser beam generator 110 is diffused by a lens 113 to form a circular cross section of diameter 5 mm at the edge face of the pyroelectric member 103.

The intensity of the X-ray passing through the beryllium window 108 is detected by a GM counter 115.

Figure 5:
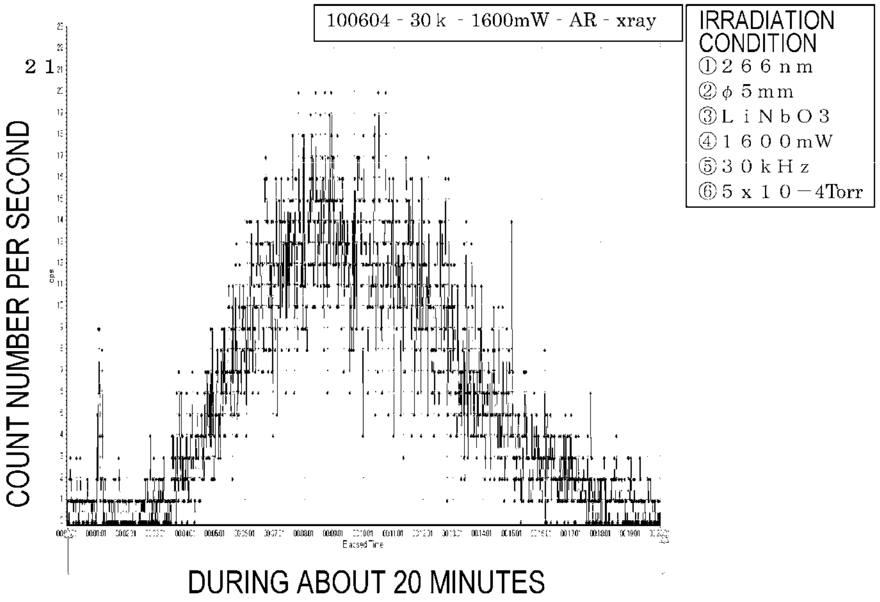
FIG. 5 is an output chart of an X-ray generator of an example.

When the YAG laser beam was irradiated by the 30 kHz rectangular pulse with the intensity of 1600 mW, the generated X-ray was observed as shown in FIG. 5. In FIG. 5, the vertical scale indicates the count number of the GM counter.

Figure 6:
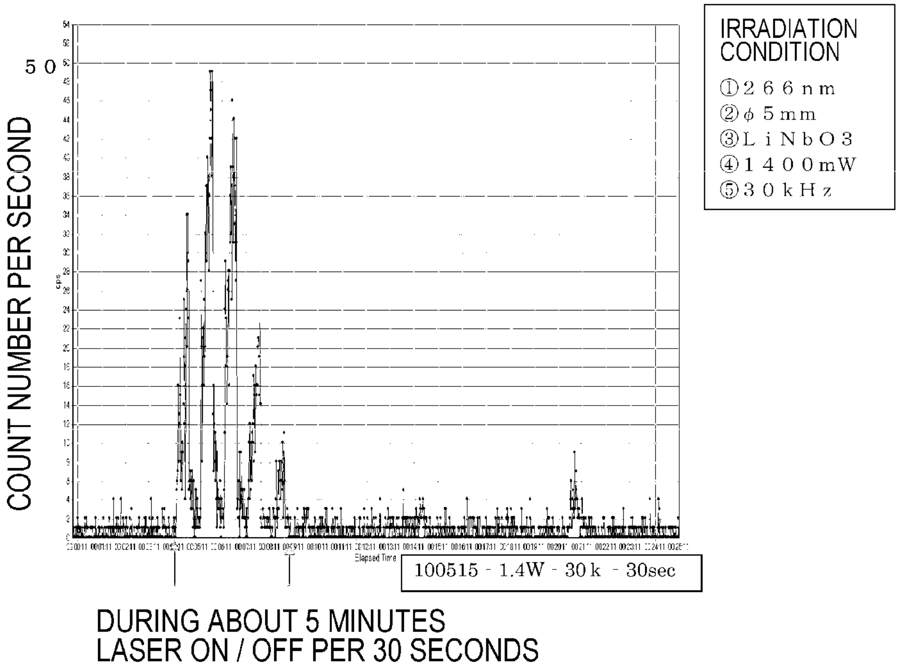
FIG. 6 is an output chart of an X-ray generator of another example.

The YAG laser beam is irradiated continuously in the experiment shown in FIG. 5. On the other hand, when the YAG laser beam is irradiated intermittently, the result is shown in FIG. 6. As shown in FIG. 6, it is recognized that the generation and shutoff of the X-ray are synchronized with the on and off of the ultraviolet ray.

Figure 7:
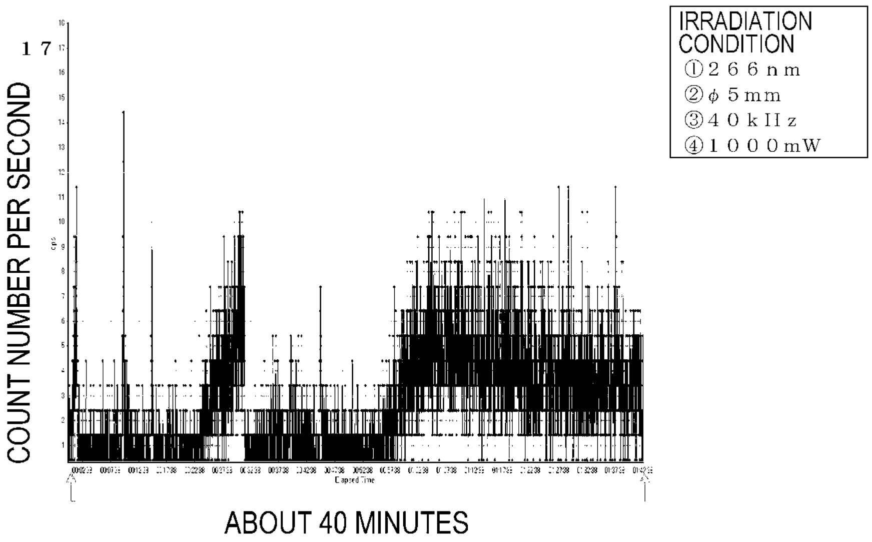
FIG. 7 is an output chart in cased that a distinct pyroelectric member is used.
Figure 8:
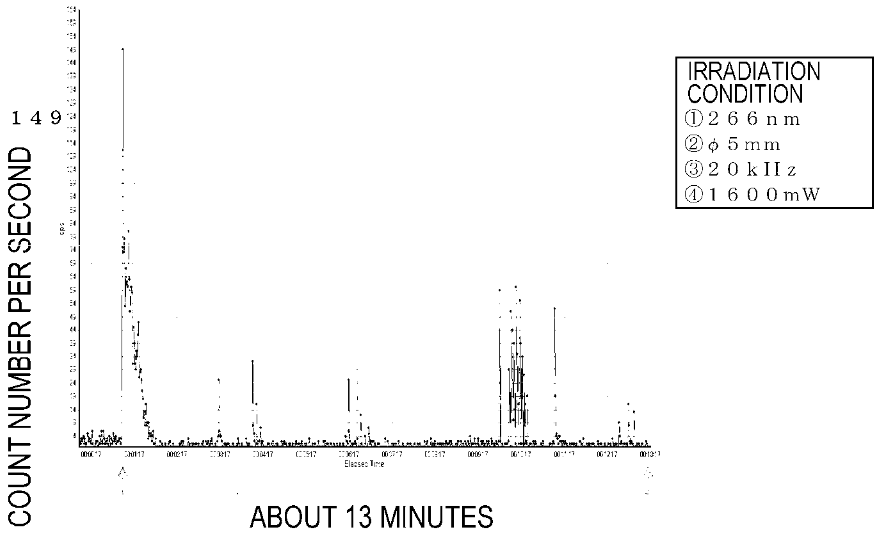
FIG. 8 is an output chart in cased that another distinct pyroelectric member is used.

FIGS. 7 and 8 show the output result of the X-ray when $LiTaO_3$ is used for the electron beam emitting device in the apparatus shown in FIG. 4.

The larger the pyroelectric coefficient becomes, the larger the generated voltage becomes. So, even if the power irradiation on $LiTaO_3$ is lower than that on $LiNbO_3$, the power irradiation on $LiTaO_3$ is likely more effective than that on $LiNbO_3$.

Incidentally, the pyroelectric coefficient becomes maximum rightly below Curie temperature.

In addition, Curie temperatures of $LiTaO_3$ and $LiNbO_3$ are respectively 690 degrees C. and 1200 degrees C.

Figure 9:
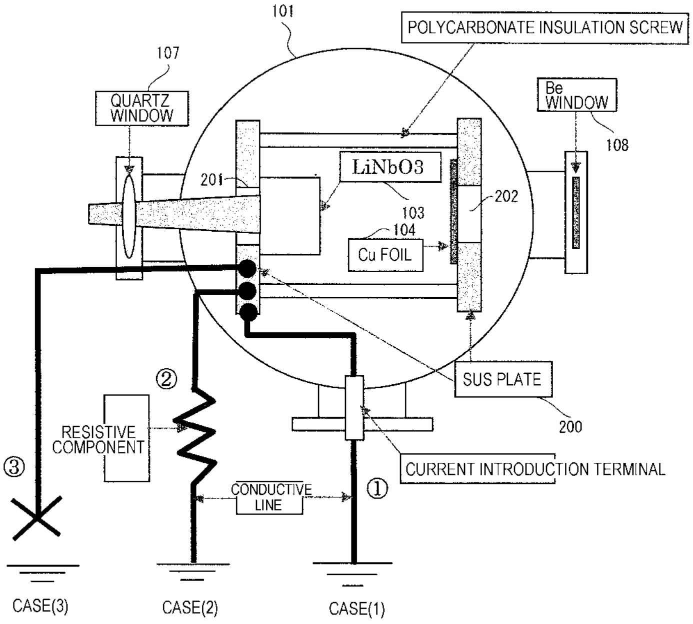
FIG. 9 is a sectional view showing a detail within a chamber.
Figure 10A:
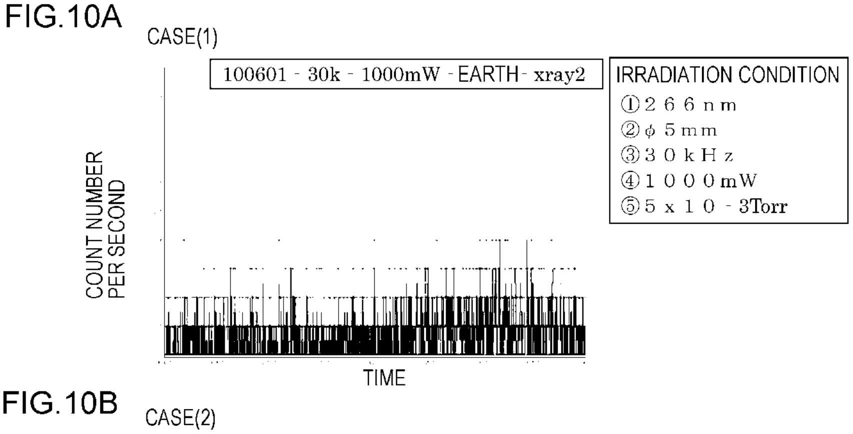
FIGS. 10A-10C are charts showing an output of an X-ray in respective configurations of a SUS plate.
Figure 10B:
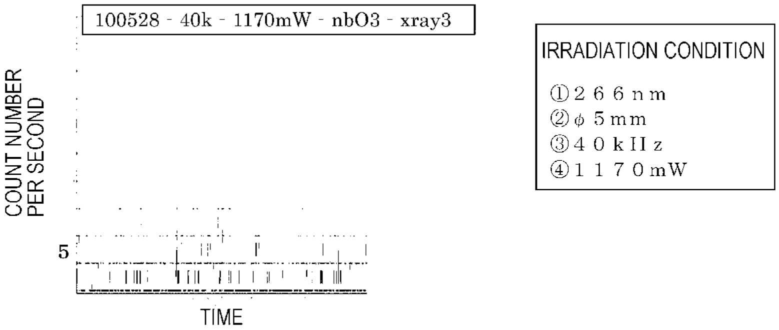
Figure 10C:
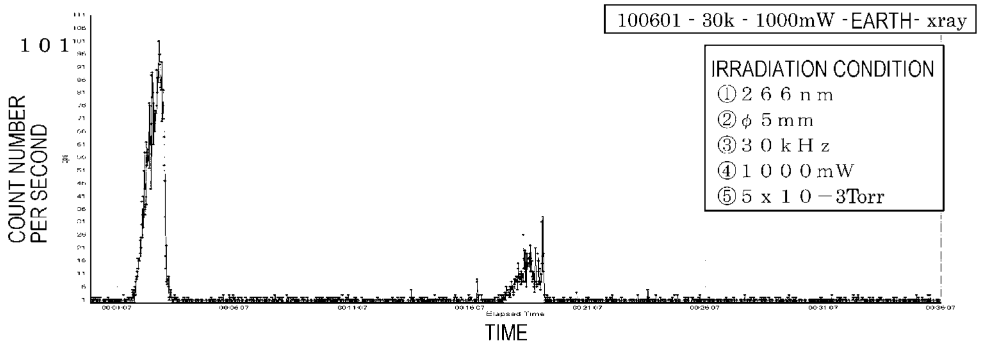

FIG. 9 is a diagram showing the constitution of the chamber 101 inside of the X-ray generator 1 of an example in detail. The same element as that of FIG. 4 is referred to the same numeral as that of FIG. 4 and the explanation thereof is eliminated.

In a pair of SUS plates of the example, the through-holes 201 and 202 are formed. In the periphery of the through-hole 201 of the SUS plate 200 disposed at the ultraviolet ray irradiation side, ultraviolet laser beam receiving surface of the pyroelectric member 103 is fixed through conductive material. The copper foil 104 is fixed in the periphery of the through-hole 202 of the SUS plate 200 disposed at the X-ray emission side. The pair of SUS plates 200 and 200 are fixed by a insulation screw formed of polycarbonate.

In case (1), when the SUS plate 200 disposed at the ultraviolet ray irradiation side is connected to ground, X-ray is not generated.

Incase (2), also when the SUS plate 200 disposed at the ultraviolet ray irradiation side is contacted with the chamber 101 and connected to ground through the chamber 101, X-ray is not generated.

In case (3), on the other hand, when the SUS plate 200 disposed at the ultraviolet ray irradiation side is not connected to ground, X-ray is generated.

In the state that the SUS plate 200 disposed at the ultraviolet ray irradiation side is not connected to ground as described in case (3) above, the configuration for mounting the electron beam emitting device 103 on the SUS plate 200 and the effect for generating the X-ray are shown in FIGS. 11-14. In FIGS. 11-14, the same element as that of FIG. 9 is referred to the same numeral as that of FIG. 9 and the explanation thereof is eliminated.

Figure 11A:
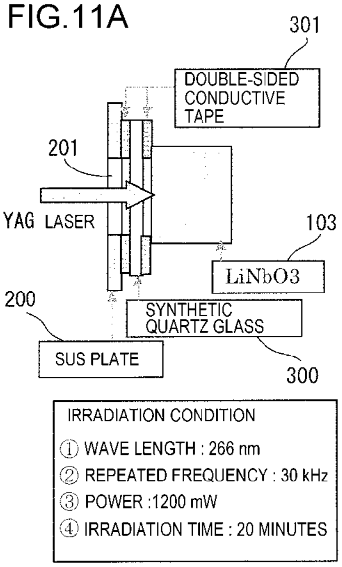
FIGS. 11A-11C are diagrams showing a configuration of a pyroelectric member to a SUS plate, an output chart of an X-ray and a temperature change.
Figure 11B:
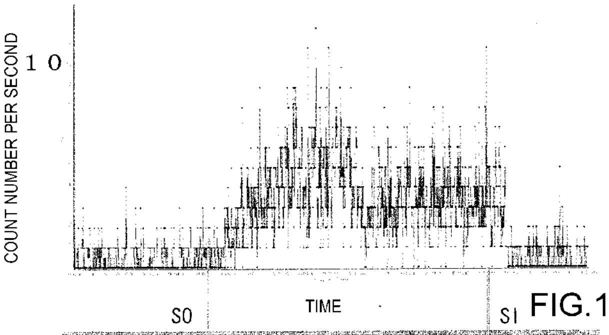
Figure 11C:
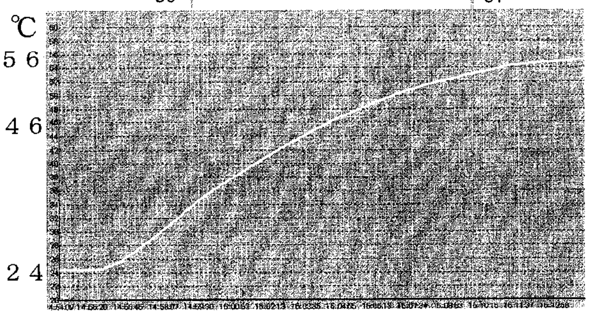

In the example of FIGS. 11A-11C, the electron beam emitting device 103 is mounted on the SUS plate 200 through synthetic quartz glass 300 and double-sided conductive tapes 301 as shown in FIG. 11A. In such the example, it is observed that the X-ray is generated as shown in FIG. 11B. The temperature change in the device 103 is shown in FIG. 11C.

Incidentally, there is a time lag of about 240 seconds (S0=300 seconds) between the irradiation of ultraviolet laser beam and the generation of X-ray. The irradiation of ultraviolet laser beam is terminated at time S1 (=1000 seconds) as shown in FIGS. 11B and 11C.

Figure 12A:
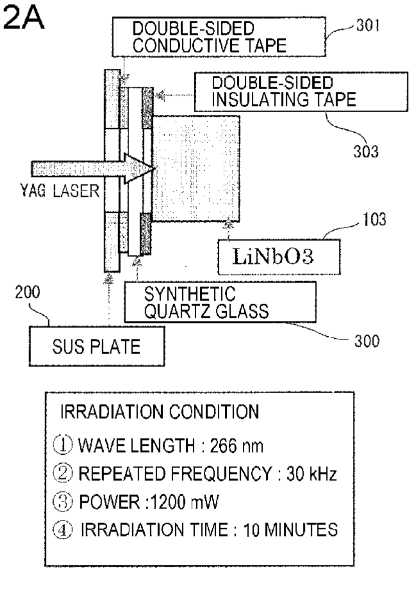
FIGS. 12A-12C are diagrams showing a configuration of a pyroelectric member to a SUS plate, an output chart of an X-ray and a temperature change.
Figure 12B:
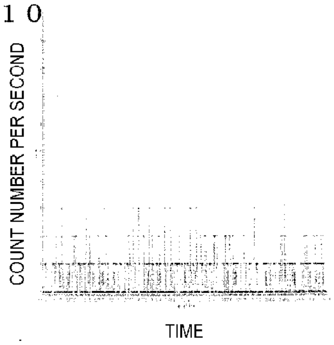
Figure 12C:
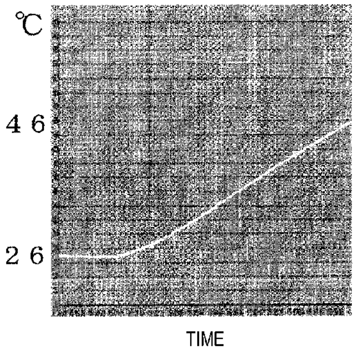

In the example of FIGS. 12A-12C, insulating material constituted by a double-sided insulating tape 303 is provided between the synthetic quarts glass 300 and the device 103 as shown in FIG. 12A. Also in such the example, although the temperature rise is observed, the generation of the X-ray is not observed as shown in FIGS. 12B and 12C.

Figure 13A:
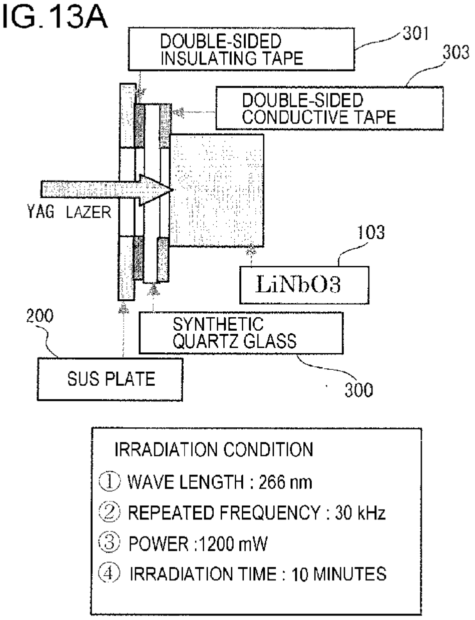
FIGS. 13A-13C are diagrams showing another configuration of a pyroelectric member to a SUS plate, an output chart of an X-ray and a temperature change.
Figure 13B:
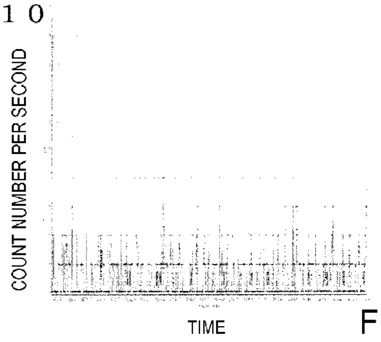
Figure 13C:
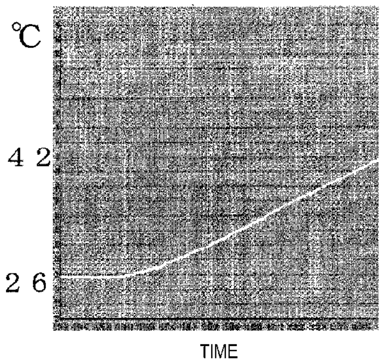

In the example of FIGS. 13A-13C, insulating material constituted by a double-sided insulating tape 301 is provided between the SUS plate 200 and the synthetic quarts glass 300 as shown in FIG. 13A. Also in such the example, although the temperature rise is observed, the generation of the X-ray is not observed as shown in FIGS. 13B and 13C.

Figure 14A:
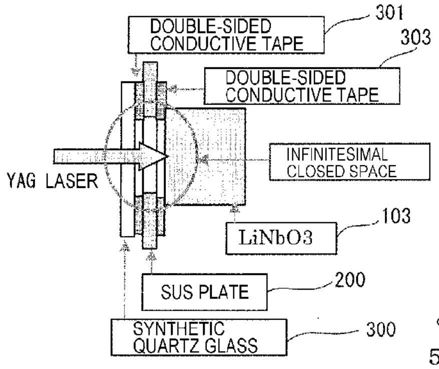
FIGS. 14A-14C are diagrams showing another configuration of a pyroelectric member to a SUS plate, an output chart of an X-ray and a temperature change.
Figure 14B:
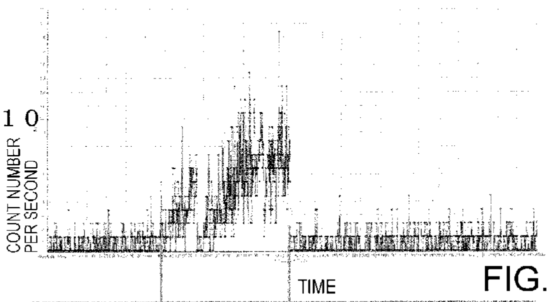
Figure 14C:
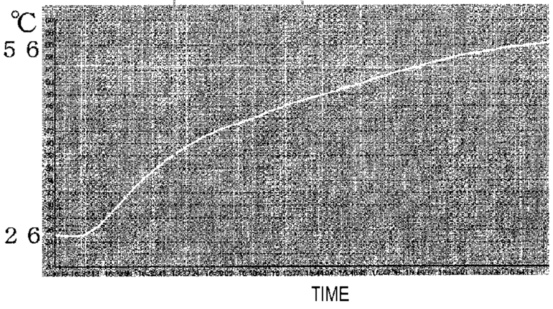

In the example of FIGS. 14A-14C, the device 103 is mounted through the double-sided conductive tape 301 directly on the SUS plate 200. In the example, the generation of X-ray is observed as shown in FIG. 14B. Incidentally, there is a time lag of about 240 seconds (S3=300 seconds) between the irradiation of ultraviolet laser beam and the generation of X-ray. The irradiation of ultraviolet laser beam is terminated at time S4 (=720 seconds) as shown in FIGS. 14B and 14C.

Considering the configuration for supporting the pyroelectric member 103 from the result shown in FIGS. 11A-14C, it is recognized preferably that the ultraviolet ray receiving surface should be fixed to the conductor by keeping electric conductivity.

Considering the result shown in FIGS. 11A-14C, the electron beam emission from the pyroelectric member 103, namely the generation of X-ray is not produced by the temperature rise of the pyroelectric member. In the examples shown in FIGS. 12A-12C and 13A-13C, although the temperature rise is observed, the generation of X-ray is not detected.

Next, study on the intensity of ultraviolet laser is shown in FIGS. 15-21A.

Figure 15:
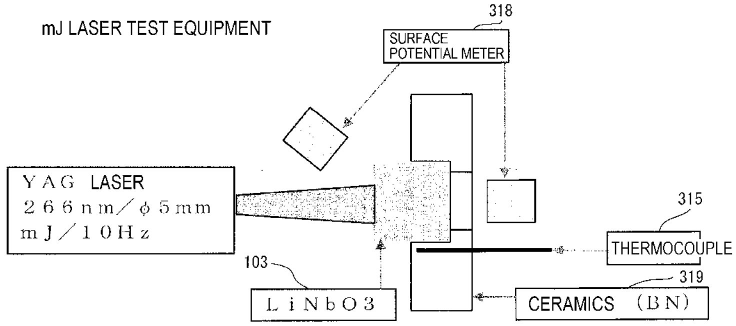
FIG. 15 shows an equipment for measuring a temperature and a surface potential of a pyroelectric member when an ultraviolet laser beam with an unitary pulse of mJ order intensity is irradiated on the ptroelectric member.

FIG. 15 shows an apparatus for measuring the potential and the temperature of the surface of the pyroelectric member 103 when ultraviolet laser beam (mJ laser beam) with the comparatively strong intensity of unitary pulses is irradiated on the pyroelectric member 103. In FIG. 15, the numeral 315 indicates a thermocouple thermometer and the numeral 318 indicates a surface potential meter. The peripheral surface of the pyroelectric member 103 is supported by a retainer 319 formed of ceramic to reduce the temperature rise of the pyroelectric member 103 caused by the ultraviolet laser beam as low as possible.

Figure 16:
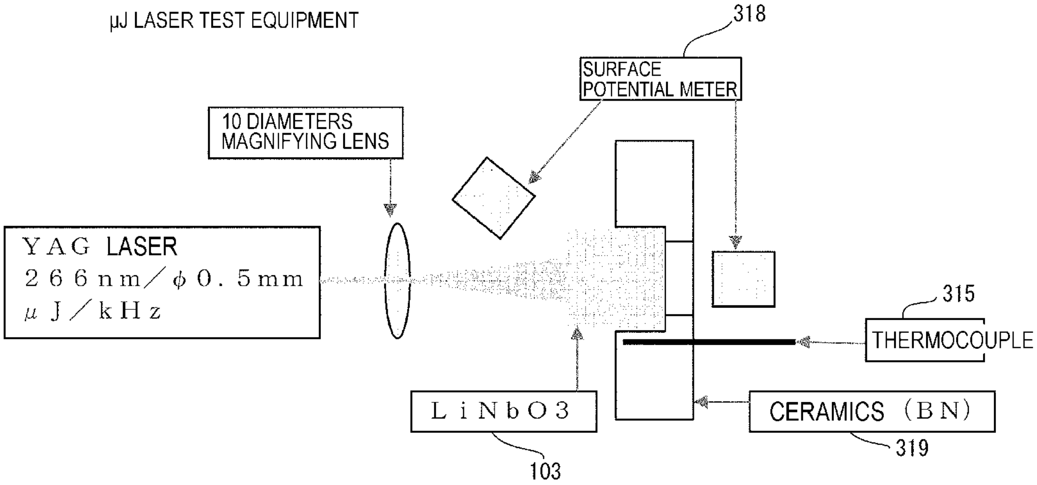
FIG. 16 shows an equipment for measuring a temperature and a surface potential of a pyroelectric member when an ultraviolet laser beam with an unitary pulse of μJ order intensity is irradiated on the ptroelectric member.

FIG. 16 shows a configuration when ultraviolet laser beam (μJ laser beam) with the comparatively weak intensity of unitary pulses is irradiated on the pyroelectric member 103. In FIG. 16, the same element as that of FIG. 15 is referred to the same numeral as that of FIG. 15 and the explanation thereof is eliminated.

In each example shown in FIG. 15 or 16, the power of the ultraviolet laser beam per unit time is the same each other (as referred to 400 mW, for example).

In the pyroelectric member 103 irradiated by the ultraviolet laser beam shown in FIG. 15, the ultraviolet laser beam receiving surface is changed to black color. On the other hand, in the pyroelectric member 103 irradiated by the ultraviolet laser beam shown in FIG. 16, the ultraviolet laser beam receiving surface does not change in color.

Figure 17A:
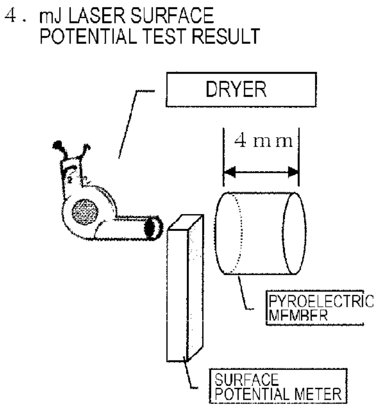
FIGS. 17A and 17B show a surface potential of a pyroelectric member heated and cooled.
Figure 17B:
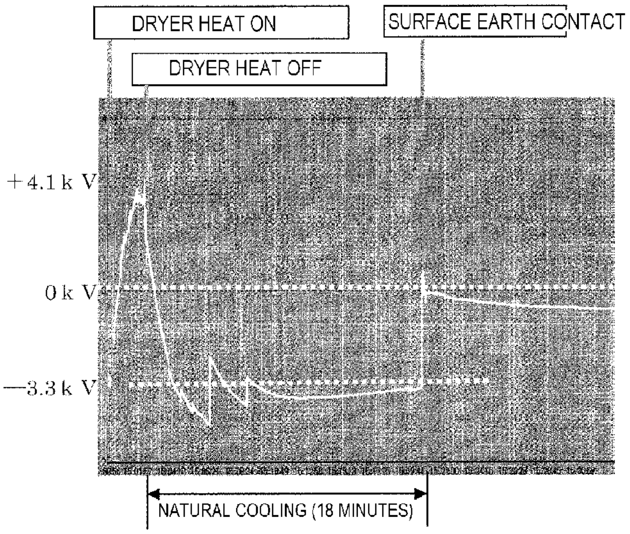

FIGS. 17A and 17B show the relation between the temperature of the pyroelectric member 103 and the surface potential of the ultraviolet laser beam receiving surface shown in FIGS. 15 and 16. As shown in FIGS. 17A and 17B, if the pyroelectric member 103 is heated, the surface potential of the pyroelectric member is also changed to make electrons on the surface emittable. Here, the pyroelectric member 103 is heated by hot air generated by a dryer commercially available.

Figure 18A:
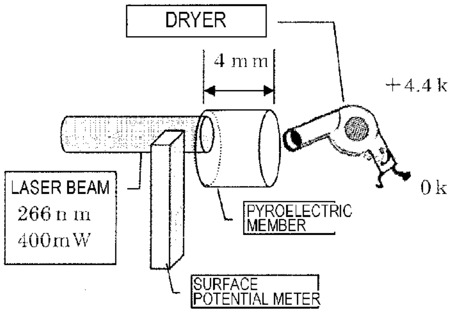
FIGS. 18A and 18B show a surface potential on an ultraviolet laser beam receiving surface of a pyroelectric member when an mJ order ultraviolet laser beam is irradiated on the pyroelectric member heated and cooled.
Figure 18B:
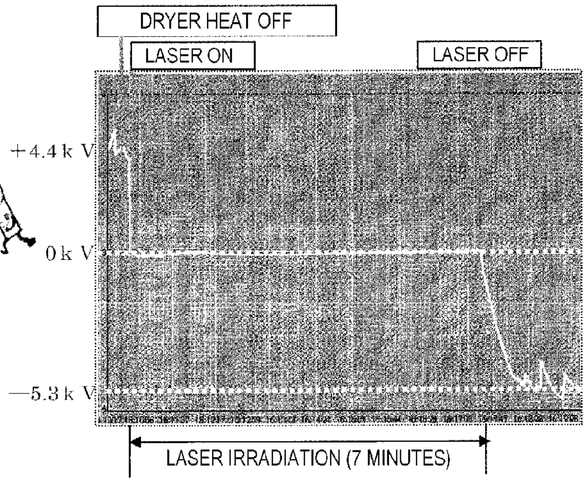
Figure 19A:
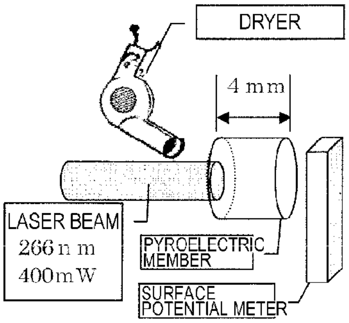
FIGS. 19A and 19B show a surface potential on an electron beam emitting surface of a pyroelectric member when an mJ order ultraviolet laser beam is irradiated on the pyroelectric member heated and cooled.
Figure 19B:
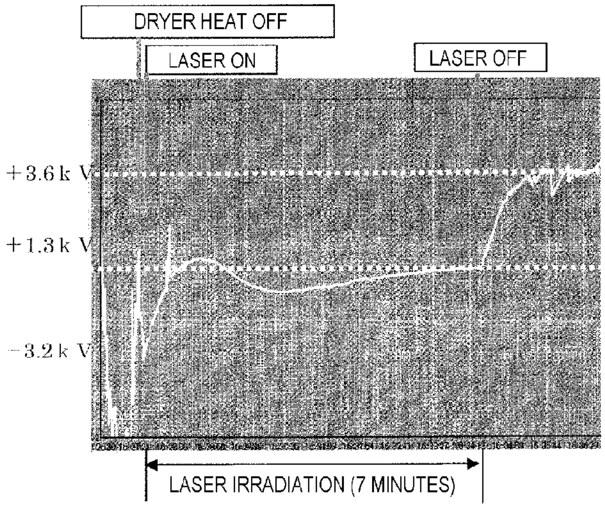
Figure 20A:
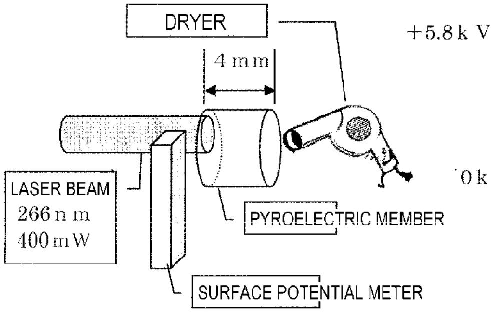
FIGS. 20A and 20B show a surface potential on an ultraviolet laser beam receiving surface of a pyroelectric member when an μJ order ultraviolet laser beam is irradiated on the pyroelectric member heated and cooled.
Figure 20B:
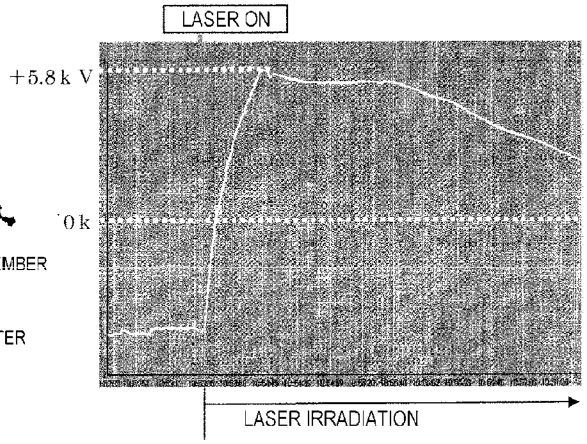
Figure 21A:
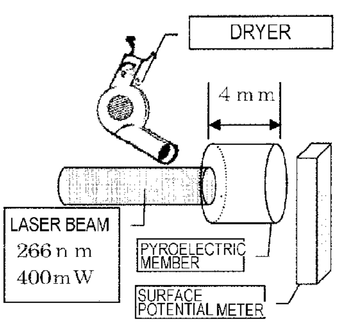
FIGS. 21A and 21B show a surface potential on an electron beam emitting surface of a pyroelectric member when an μJ order ultraviolet laser beam is irradiated on the pyroelectric member heated and cooled.
Figure 21B:
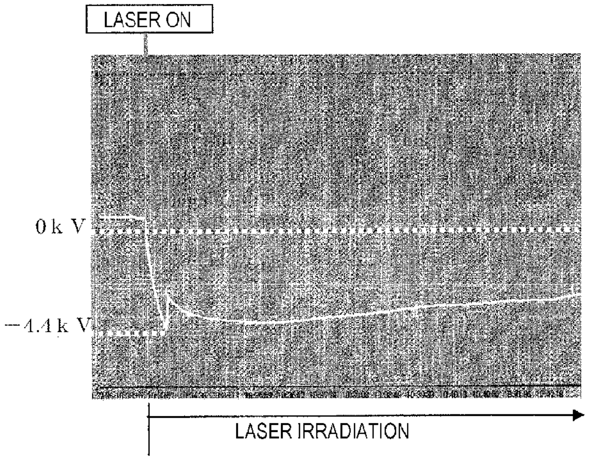

As shown in FIGS. 18A and 18B, when the ultraviolet laser beam with the comparatively strong intensity of unitary pulses shown in FIG. 15 is irradiated on the pyroelectric member 103 which is heated in the same condition as that of FIGS. 17A and 17B, the surface potential on the ultraviolet laser beam receiving surface of the pyroelectric member 103 becomes zero. Similarly, as shown in FIGS. 19A and 19B, the surface potential of the electron beam emitting surface also becomes zero.

In the state described above, the electron beam is not emitted.

In other words, although the surface of the pyroelectric member 103 is charged in the same heating condition as that of FIGS. 17A and 17B to complete the function of the pyroelectric member itself, if the ultraviolet laser beam is irradiated in the same condition as that of FIGS. 18A and 18B, the surface of the pyroelectric member 103 becomes 0V to cease the emission of electron beam, eventually generating no X-ray.

On the other hand, as shown in FIGS. 20A, 20B, 21A and 21B, when the ultraviolet laser beam with the comparatively weak intensity of unitary pulses shown in FIG. 16 is irradiated on the pyroelectric member 103 which is heated in the same condition as that of FIGS. 17A and 17B, the ultraviolet laser beam receiving surface of the pyroelectric member 103 is charged.

From the results shown in FIGS. 15-21B, it is recognized that the energy of the ultraviolet laser beam makes an effect on the emission of the electron beam from the pyroelectric member, eventually the generation of X-ray.

The energy of the ultraviolet laser beam is chosen appropriately to hold the charged state on the surface of the pyroelectric member, namely the electron beam emitting device.

It is preferred according to the study of the Inventors that the intensity of an unitary pulse is less than 1000 μJ or equal to 1000 μJ and the width of the unitary pulse is less than 100 ns or equal to 100 ns.

In addition, even if the intensity of the unitary pulse is 1-100 mJ, if the width of the unitary pulse is chosen by psec or fsec order or the cooling effect is thoroughly exerted, the denaturalization on the surface of the pyroelctric body can be prevented to keep the charged state on the surface. By the way, mJ pulse energy is not practical since it is difficult to transmit mJ pulse energy through an optical fiber at present.

Figure 22:
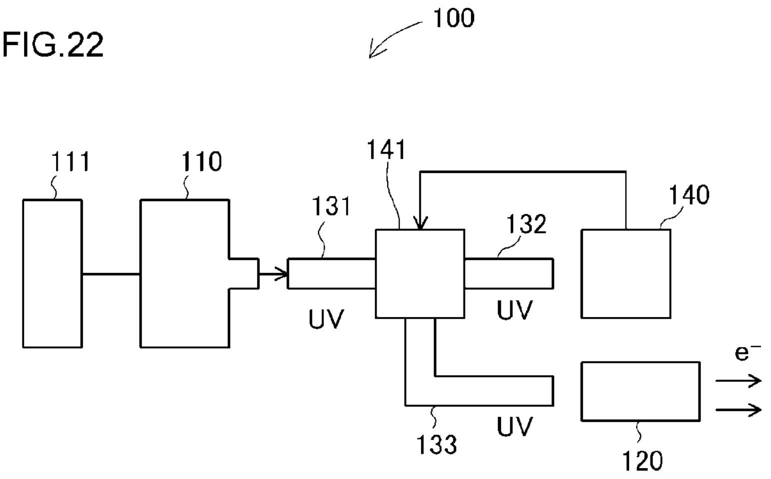
FIG. 22 is a block diagram showing another embodiment.

FIG. 22 shows an apparatus of another embodiment.

The apparatus 100 has an ultraviolet laser beam generator 110, an electron beam emitting device 120, optical fibers 131-133, a detector 140 and a switching device 141.

The ultraviolet laser beam generator 100 generates an ultraviolet laser beam with the intensity of an unitary pulse less than 1000 μJ or equal to 1000 μJ and the width of the unitary pulse less than 100 ns or equal to 100 ns, namely the ultraviolet laser beam transmittable through the optical fibers 131-133 for an ultraviolet ray. The numeral 111 indicates a controller for the ultraviolet laser beam generator.

For the optical fibers 131-133, an optical fiber network used for an optical communication network is available.

For example, when a specific pulse signal is included in an ultraviolet laser ray transmitted through the optical fiber 132, the detector 140 activates a switching device 141 to irradiate the ultraviolet laser beam from the ultraviolet laser beam generator 100 through the optical fiber 133 on the electron beam emitting device 120. Accordingly, electrons are emitted from the electron beam emitting device 120.

The constitution described above includes a configuration that a light ordinarily transmitted through an optical fiber network is used for an optical communication and if the specific signal is detected by the detector 140, the optical fiber network connects the ultraviolet laser beam generator 100 and the electron beam emitting device 120. The specific signal described above is also transmitted to the controller 111 to drive the ultraviolet laser beam generator 100.

Figure 23:
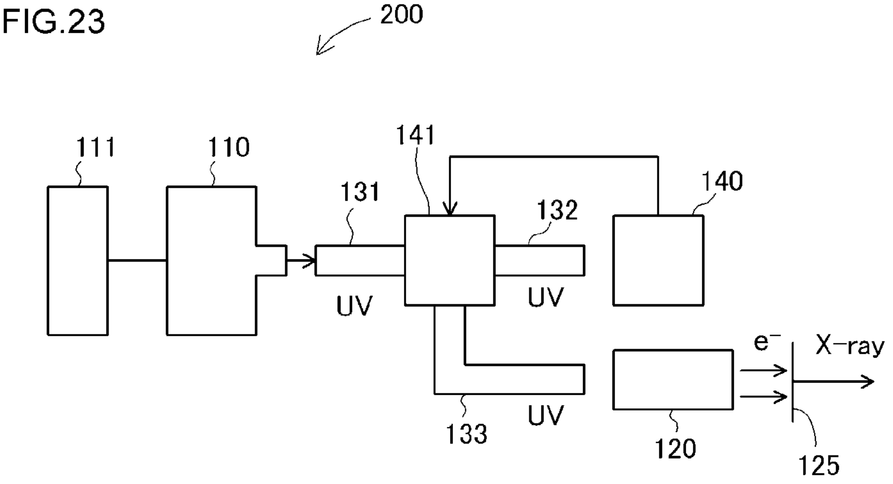
FIG. 23 is a block diagram showing another embodiment.

FIG. 23 shows an apparatus 200 of another embodiment.

In FIG. 23, the same element as that of FIG. 22 is referred to the same numeral as that of FIG. 22 and the explanation thereof is eliminated.

In the embodiment, a metal piece 125 including copper foil or the like is provided on the electron beam emitting surface side of the electron beam emitting device 120 to emit an X-ray from the metal piece 125.

The operations of other elements are similar to those of FIG. 22.

Figure 24:
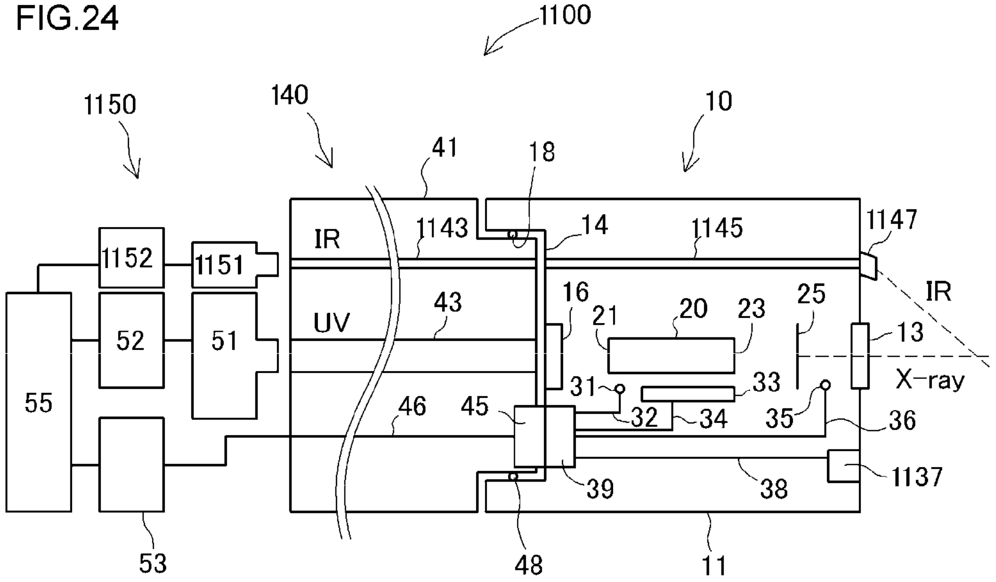
FIG. 24 is a block diagram showing another embodiment.

FIG. 24 shows the present invention of another embodiment.

In FIG. 24, the same element as that of FIG. 1 is referred to the same numeral as that of FIG. 1 and the explanation thereof is eliminated.

In the embodiment of FIG. 24, the head unit 10 is provided with an infrared ray emitting unit 1147. An infrared laser beam IR from the infrared ray emitting unit 1147 is emitted on an X-ray irradiation region. Accordingly, the X-ray irradiation region can be heated. A detecting unit indicated by the numeral 1137 is provided with a radiation type thermometer to measure the temperature of the region irradiated by the infrared laser beam IR.

The infrared laser beam is generated from an infrared laser beam generator 1151. Then, the infrared laser beam is introduced through an infrared ray fiber 1143 built in the fiber unit 41 into an infrared ray path 1145 of the head unit 10. The infrared ray path 1145 is also constituted by an infrared ray fiber. Although the infrared ray path 1145 is penetrated through the inside of the head unit 10 in FIG. 24, the infrared ray path 1145 is not necessarily provided within the head unit 10 which is deaerated for the electron beam emitting device 20. Namely, the infrared ray path 1145 may be disposed at a space separated from the electron beam emitting device 20 by providing a partition wall between the electron beam emitting device 20 and the infrared ray path 1145. Also a thermometer 1137 and the control system 38 and 39 for controlling the thermometer 1137 may be disposed similarly.

The numeral 1152 indicates a controller for controlling the infrared laser generator 1151.

It is preferred that a plurality of infrared ray emitting units 1147 are disposed at equal distances around the X-ray emitting window provided at the center. As a result, the efficiency for rising the temperature on the X-ray irradiation region is improved. Instead of the infrared ray emitting unit 1147 used for a heating unit, a heater may be provided in contact with the X-ray irradiation region or near to the X-ray irradiation region.

A detecting unit 1137 may be provided with a CCD for detecting an infrared ray to form an image of the X-ray irradiation region.

The apparatus shown in FIG. 24 is used effectively for a hyperthermia treatment, for example.

Figure 25:
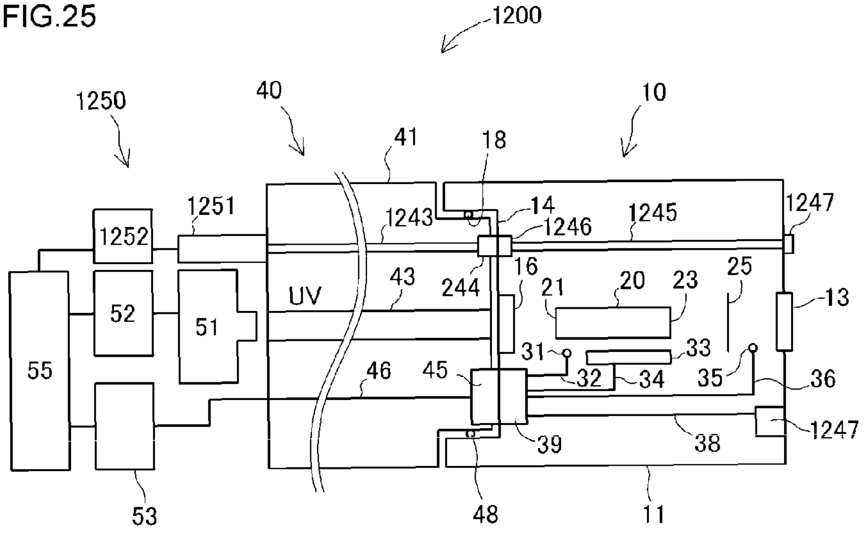
FIG. 25 is a block diagram showing another embodiment.

FIG. 25 shows the present invention of another embodiment. Incidentally, the same element as that of FIG. 24 is referred to the same numeral as that of FIG. 24 and the explanation thereof is eliminated.

In the embodiment of FIG. 25, the head 10 is provided with a gas/liquid supply apparatus 1247. The gas/liquid supply apparatus 1247 is configured to form a nozzle-like figure for ejecting gas or liquid on the X-ray irradiation region. Accordingly, the X-ray irradiation region can be cleaned up around the X-ray irradiation, namely before, during and after the X-ray irradiation.

In addition to the cleaning of the X-ray irradiation region, antisepsis, treatment or dyeing of the X-ray irradiation region can be performed by selecting a gas or a liquid.

The gas or the liquid is ejected from a pump 21 to a tube 1243 built in the fiber unit 41. The numeral 1244 indicates a connector at the side of the fiber unit 41, and the numeral 1246 indicates a connector at the side of the head. The head unit 10 is also provided with a tube 1245 to supply the gas or the liquid for the nozzle 1247. In the head unit 10, the tube 1245 may be separated from the electron beam emitting device 20.

A detecting unit 1247 is provided with at least one photo detector for detecting various kinds of wavelengths of the lights emitted from the X-ray irradiation region. The light emitted from the X-ray irradiation region includes a visible light, an infrared ray, an ultraviolet ray and an X-ray in the wavelength of the light.

The following effects are obtained by using the detector 1247.

Distinguished from the irradiation from the outside of a living body, it is very important to be able to observe "chemical radiation" itself directly by irradiating rightly on the object before the "chemical radiation" passes through other parts.

1. It becomes possible to observe biochemical and physiological information on a cell and a tissue by utilizing various spectroscopic features of a living tissue without the effect caused by the scattering of other tissues.
2. In the prior art, the scattering of other tissues or the like causes fluctuation phenomena in a spectrum. So, it is necessary to obtain the exact information by calculating correlation between an exact spectrum and an observed spectrum through various kinds of "correlation spectroscopy". In the embodiment of the present invention, the exact information can be obtained without calculating the correlation.

A living body examination by endoscopic X-ray irradiation realizes optical diagnostics. In the optical diagnostics, it becomes possible to observe various kinds of fluorescent phenomena reflecting the energy state of a cell and the density of a specific ion including a metal ion of Ca2+ or the like by using a fluorescent reagent called as a contrast agent in general. For example, in the optical diagnostics, it becomes possible to observe a specific cancer cell. As a result, in the optical diagnostics, a region ranging from a cell level to the whole tissue can be observed. These observations cannot be realized by the optically transmitting image examination of the prior art.

The embodiments of FIGS. 24 and 25 may be applied to the embodiment of FIG. 2.

A way studied by the Inventors for stably outputting an X-ray long time is described in the following.

Isopropyl alcohol is introduced as reducing gas into a vacuum vessel which holds a pyroelectric member. The pressure within the vessel is always held 2–3×$10^{-2}$ Torr by a vacuum pump.

Although the region within the vessel supplied with the reducing gas is not particularly restricted, it is preferred that the reducing gas is effectively supplied on the electron beam emitting surface.

Figure 26:
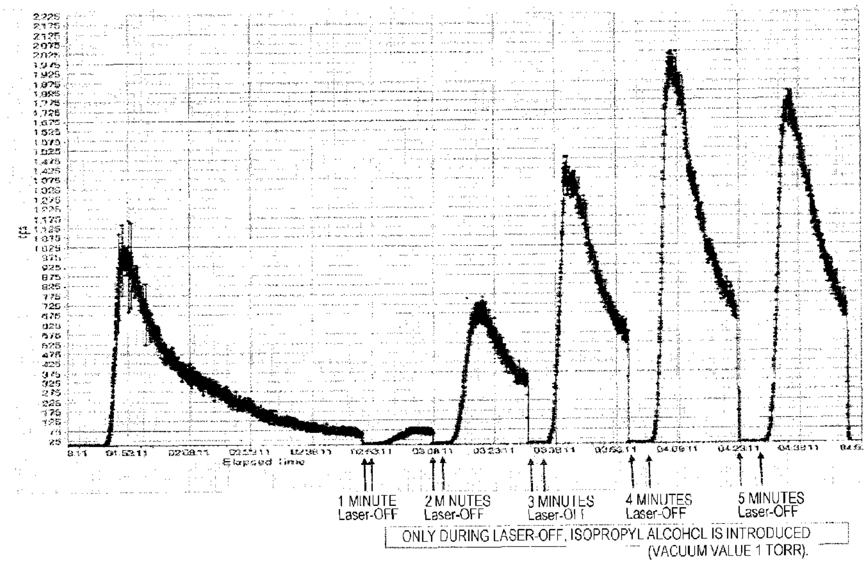
FIG. 26 is a graph showing a recovery of an X-ray generator.

FIG. 26 shows a result when isopropyl alcohol is introduced to the vessel 101 of the apparatus shown in FIG. 4. From the result shown in FIG. 26, it is understood that when isopropyl alcohol is introduced with the laser off, the emission of X-ray recovers.

Isopropyl alcohol is introduced by a quantity to keep the pressure about 1 Torr within the vessel 101. However, the quantity is not limited as described above.

Incidentally, when the laser is on, even if isopropyl alcohol is introduced, the emission of X-ray does not recover.

For making a condition for emitting the X-ray, the electron is emitted from the pyroelectric member to the copper foil. So, it becomes important to provide the electron on the electron emitting surface of the pyroelectric member. If described in another aspect, it becomes important to provide a hydrogen bond on the electron emitting surface. Accordingly, reducible isopropyl alcohol is used for an electron source. Other reducible alcohol or hydrogen gas may be used as a reducible substance.

For providing the hydrogen bond on the electron beam emitting surface, when the reducible gas is supplied, the laser is suspended to deactivate the electron beam emitting surface.

Namely, for revitalizing the electron emitting device including the pyroelectric member or the like, while the reducible gas is supplied at least on the electron beam emitting surface, the laser is switched off to deactivate the electron beam emitting surface.

As described above, the revitalization is described as to the emission of X-ray, which suggests the revitalization of the electron beam emitting function of the electron beam emitting device.

The present invention is not limited to the illustrated embodiments or examples alone, but may be changed or modified within the scope easily devised by those skilled in the art without departing from the spirit of the present invention.

DESCRIPTION OF THE REFERENCE NUMERALS

1, 60, 100, 110 X-ray generator
10 Head unit

11 Chassis
13 X-ray transmission window
16 Ultraviolet laser beam transmission window
20, 103 Electron beam emitting device
21 Ultraviolet laser beam receiving surface
23 Electron beam emitting surface
25, 104 Metal piece
41 Fiber unit
43 Optical fiber
51 Ultraviolet laser beam generator

The invention claimed is:

1. An X-ray generator comprising:

an ultraviolet laser beam generator;

an electron beam emitting device having an ultraviolet laser beam receiving surface for receiving an ultraviolet laser beam generated by the ultraviolet laser generator and an electron beam emitting surface distinguished from the ultraviolet laser beam receiving surface for emitting an electron beam; and a metal piece for receiving the electron beam emitted from the electron beam emitting surface to emit an X-ray;

wherein the ultraviolet laser beam receiving surface of the electron beam emitting device is positioned in an atmosphere.

2. The X-ray generator according to claim 1, further comprising:

a protection film stable and transparent to the ultraviolet laser beam for covering the ultraviolet laser receiving surface of the electron beam emitting device.

3. The X-ray generator according to claim 2, wherein the protection film is conductive and insulated from a ground.

4. The X-ray generator according to claim 2, wherein the protection film is dielectric.

5. The X-ray generator according to claim 2, wherein the protection film is fixed to a conductor by keeping electric conductivity.

6. The X-ray generator according to 1, further comprising;

a gas supply unit for discharging a reducible gas to a space to which the electron beam emitting surface is exposed.

7. The X-ray generator according to claim 6, wherein the reducible gas is introduced with the laser off.

8. An electron beam emitter comprising:

an ultraviolet laser beam generator; and an electron beam emitting device having an ultraviolet laser beam receiving surface for receiving an ultraviolet laser beam generated by the ultraviolet laser generator and an electron beam emitting surface distinguished from the ultraviolet laser beam receiving surface for emitting an electron beam;

wherein the ultraviolet laser beam receiving surface of the electron beam emitting device is positioned in an atmosphere.

9. The electron beam emitter according to claim 8, further comprising:

a protection film stable and transparent to the ultraviolet laser beam for covering the ultraviolet laser receiving surface of the electron beam emitting device.

10. The electron beam emitter according to claim 9, wherein the protection film is conductive and insulated from a ground.

11. The electron beam emitter according to claim 9, wherein the protection film is dielectric.

12. The electron beam emitter according to claim 9, wherein the protection film is fixed to a conductor by keeping electric conductivity.

13. A method for emitting an ultraviolet laser beam to an X-ray generator which comprising an electron beam emitting device having an ultraviolet laser beam receiving surface for receiving the ultraviolet laser beam and an electron beam emitting surface distinguished from the ultraviolet laser beam receiving surface for emitting an electron beam, and a metal piece for receiving the electron beam emitted from the electron beam emitting surface to emit an X-ray, wherein the ultraviolet laser beam receiving surface of the electron beam emitting device is positioned in an atmosphere.

14. A method for emitting an ultraviolet laser beam to an electron emitter which comprising an electron beam emitting device having an ultraviolet laser beam receiving surface for receiving the ultraviolet laser beam and an electron beam emitting surface distinguished from the ultraviolet laser beam receiving surface for emitting an electron beam, wherein the ultraviolet laser beam receiving surface of the electron beam emitting device is positioned in an atmosphere.

* * * * *